July 29, 1958     D. L. JAFFE     2,845,601
METHOD OF COUPLING INTO MICROWAVE CAVITY
Filed July 12, 1954
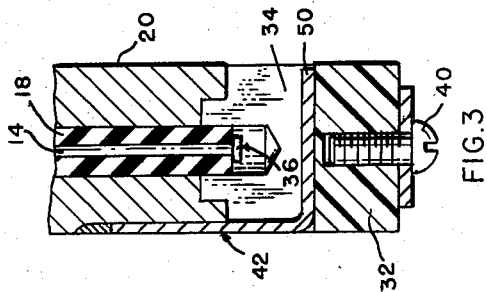
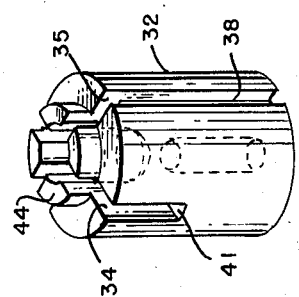
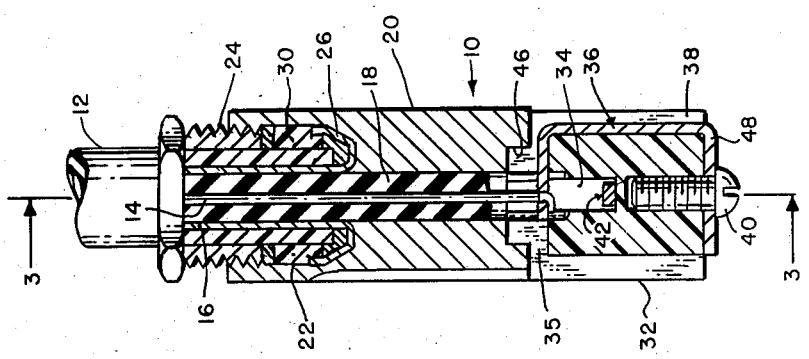
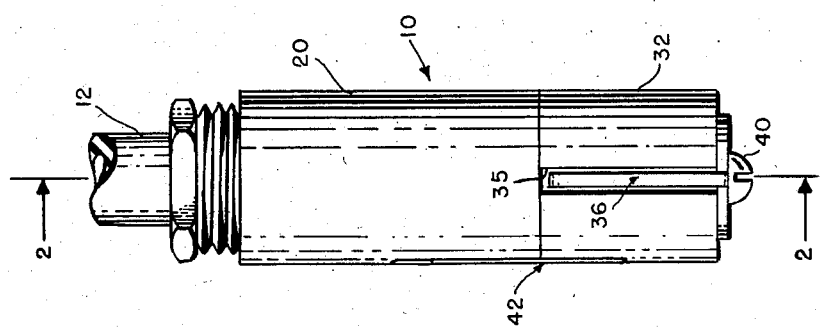
*INVENTOR.*
DAVID L. JAFFE
BY
*ATTORNEY*

United States Patent Office

2,845,601
Patented July 29, 1958

2,845,601

METHOD OF COUPLING INTO MICROWAVE CAVITY

David L. Jaffe, Great Neck, N. Y., assignor to the United States of America as represented by the Secretary of the Army Application July 12, 1954, Serial No. 442,935

4 Claims. (Cl. 333—83)

This invention relates to microwave electrical apparatus and more particularly to a coupling loop assembly for transferring energy from microwave cavity resonators.

In the past, the method generally used for extracting radio-frequency energy from a microwave oscillator cavity consisted in coupling the transmission line to the resonator by means of a single coupling loop or probe. However, it has been found that the use of a single electrostatic or electromagnetic coupling probe causes a considerable variation in energy output over an extended tuning range. This is especially true for reflex-type klystron oscillators adapted to operate over a relatively wide tuning range.

It is therefore an object of the present invention to provide a coupling probe construction which permits transfer of maximum power output from a microwave cavity over a relatively wide tuning range.

It is another object of the present invention to provide a coupling probe for extracting radio-frequency energy from a microwave cavity resonator wherein the energy output remains substantially constant over a relatively wide tuning range.

In accordance with the present invention, two spaced discrete coupling members shaped as open loops may be used in combination with a coaxial type transmission line. The coupling loops are orthogonally positioned relative to each other. One of the coupling loops is connected at one end to the inner conductor of the coaxial line and the other end thereof is electrostatically coupled to the inner conductor of the cavity resonator. One end of the other coupling loop is capacitively coupled to the inner conductor of the coaxial line and the other end thereof is positioned within the cavity resonator to inductively pick up the radio-frequency energy therein.

For a better understanding of the invention, together with other and further objects thereof, reference is had to the following description taken in connection with the accompanying drawings in which:

Figure 1 is a front elevation view of the coupling probe assembly;

Figure 2 is a section of the coupling probe assembly of Figure 1 taken along the lines 2—2;

Figure 3 is a section taken along lines 3—3 of Figure 2; and

Figure 4 is a view, in perspective, showing the details of the probe cap.

Referring now to Figures 1-3 of the drawing, there is shown at 10 a coupling probe assembly terminating a conventional coaxial transmission line 12 having an inner conductor 14 and an outer conductor 16 spaced therefrom by means of insulation member 18. Coaxial line 12 extends through a bore provided in a probe body member 20 made of brass or any other suitable conductive material. The upper end of probe body member 20 is provided with a U-shaped cutout portion 22 having a screw thread adapted to threadably engage a bushing 24 which encompasses coaxial line 12. Outer conductor 16 is terminated at the base of the U-shaped cutout as shown at 26 and is silver soldered to probe body member 20, the remainder of the coaxial line passing through the bore in body member 20. Intermediate threaded bushing 24 and outer conductor 16 there is provided an insulated bushing 30 to maintain the end of conductor 16 in good electrical contact with probe body member 20 at all times.

Affixed to the lower end of probe body member 20 is a probe cap 32, the details of which are shown in Figure 4, made of any suitable insulating material such as the commercial product known as "Textolite." As shown in Figure 4, probe cap 32 is provided with two discrete transverse channels or grooves 34 and 35 orthogonally positioned relative to each other, and a longitudinal channel 38 which is combined with transverse channel 35 to form a support base for a C-shaped coupling loop 36, preferably made of brass. One end of coupling loop 36 is affixed to the base of cap 32 by means of screw 40 and the other end of the loop is soldered to inner transmission line conductor 14. Channel 34 is cut deeper than channel 35 so that its base 41 supports one end of an L-shaped coupling loop 42 spaced from that end of loop 36 which is affixed to inner conductor 14. The other end of coupling loop 42 extends upwardly from cap 32 and is silver soldered to the outer surface of probe body 20. The top of cap 32 is provided with four spaced, upwardly extending, sectorial studs 44 arranged to form an annular structure the inner periphery of which is adapted to receive inner transmission line conductor 14 and its surrounding insulator 18. The outer periphery of the formed annular structure is adapted to fit into a recess 46 provided therefor in the bottom of probe body 20.

In operation, it is to be assumed that the coaxial transmission line is coupled to a microwave cavity resonator and the probing assembly is maintained in a predetermined position within the cavity by a keyway or any other suitable means. Coupling loop 36 may be considered to be an open loop which serves to pick up energy by electrostatic coupling from surface 48 to the inner conductor of the cavity resonator. Coupling loop 42 is also an open loop, but, because of the proximity of this coupling loop to inner conductor 14, there is produced a relatively high capacity between surface 50 of loop 42 and inner conductor 14. At microwave frequencies, the reactance of this capacity is very low and hence a closed loop to inductively pick up energy within the cavity is effectively created between inner conductor 14 and outer conductor 16 which is affixed to probe body 20. The simultaneous use of both electrostatic and inductive type pickup loops may be considered to effectively form a broadband L–C filter arrangement and thus allow for maximum transfer of energy over a wide tuning range.

While there has been described what is at present considered to be the preferred embodiment of this invention, it will be obvious to those skilled in the art that various changes and modifications may be made therein without departing from the invention and it is, therefore, aimed in the appended claims to cover all such changes and modifications as fall within the true spirit and scope of the invention.

What is claim is:

1. In combination with a coaxial transmission line, a coupling probe assembly comprising two discrete spaced coupling loops having respective coupling surfaces orthogonally positioned relative to each other, one of said coupling loops being connected to the inner conductor of said coaxial transmission line, the other of said coupling loops being capacitively coupled to said inner conductor.

2. In combination with a coaxial transmission line, a coupling probe assembly comprising a probe body conductor encompassing the inner conductor of said transmission line and spaced therefrom, a first coupling member shaped as an open loop having at one end thereof a coupling surface and the other end connected to said inner conductor, and a second coupling member shaped as an open loop and spaced from said first loop, said second coupling member having at one end thereof a coupling surface and the other end thereof in contact with said probe body conductor the respective coupling surfaces of said loops being orthogonally positioned relative to each other.

3. In combination with a coaxial transmission line adapted to extract energy from the cavity of a microwave oscillator, a coupling probe assembly comprising a first open loop having one end thereof attached to the inner conductor of the transmission line, the other end of the loop being capacitively coupled to said cavity, a second open coupling loop spaced from said first loop, one end of said second loop being capacitively coupled to the inner conductor of the transmission line and oriented at right angles to the coupling surface of said first loop, the other end of said second loop being positioned within the cavity to inductively couple the energy within the cavity to said transmission line.

4. The combination in accordance with claim 2 wherein the coupling surfaces comprise flat metallic strips.

References Cited in the file of this patent

UNITED STATES PATENTS

| | | |
|---|---|---|
| 2,405,616 | Silver | Aug. 13, 1946 |
| 2,472,785 | Blitz | June 14, 1949 |
| 2,489,433 | Rambo | Nov. 29, 1949 |
| 2,624,780 | Byrne | Jan. 6, 1953 |
| 2,653,301 | Moore et al. | Sept. 22, 1953 |
| 2,798,206 | Baroch | July 2, 1957 |